(12) United States Patent
Ibach

(10) Patent No.: US 6,977,452 B2
(45) Date of Patent: Dec. 20, 2005

(54) ELECTRIC MOTOR

(75) Inventor: Claus Michael Ibach, Hong Kong (CN)

(73) Assignee: Johnson Electric S.A., La Chaux de Fonds (CH)

( * ) Notice: Subject to any disclaimer, the term of this patent is extended or adjusted under 35 U.S.C. 154(b) by 0 days.

(21) Appl. No.: 11/013,343

(22) Filed: Dec. 17, 2004

(65) Prior Publication Data

US 2005/0134126 A1    Jun. 23, 2005

(30) Foreign Application Priority Data

Dec. 20, 2003   (GB) .................................. 0329607

(51) Int. Cl.[7] .............................................. H02K 9/06
(52) U.S. Cl. ............................ 310/62; 310/58; 310/63
(58) Field of Search ............................ 310/62, 63, 58, 310/52, 60 R, 61

(56) References Cited

U.S. PATENT DOCUMENTS 6,586,853 B2 * 7/2003 Ishida et al. .................. 310/62

FOREIGN PATENT DOCUMENTS

| GB | 2 275 829 A | | 7/1994 | |
|---|---|---|---|---|
| GB | 2385715 A | * | 8/2003 | ............ H02K 9/06 |

* cited by examiner

Primary Examiner—Darren Schuberg
Assistant Examiner—Leda T. Pham
(74) Attorney, Agent, or Firm—Birch, Stewart, Kolasch & Birch, LLP

(57) ABSTRACT

A fan 30 for mounting at one end of the armature of an electric motor comprises a ring portion 40 of moulded thermoplastic material supporting an annular plate 42 with integrally formed fan blades 46 in axial alignment with exhaust vents formed in the housing of the motor. The fan blades 46 extend radially across a face of the annular plate 42 remote from the ring portion 40 and extend into the annulus of the plate. The blades 46 are grouped and centered on the winding tunnels of the armature with the axially outer edges of the blades of each group joined together by a radial wall 50 within the radial spacing of the annulus of the plate 42 but axially spaced therefrom.

10 Claims, 2 Drawing Sheets

ELECTRIC MOTOR

CROSS-REFERENCE TO RELATED APPLICATIONS

This non-provisional patent application claims priority under 35 U.S.C. § 119(a) from Patent Application No. 0329607.6 filed in Great Britain on Dec. 20, 2003.

BACKGROUND

The present invention relates to electric motors and in particular, to an internal cooling fan for a permanent magnet direct current (PMDC) electric motor.

There is a constant demand to increase the power output of small motors for a given motor size. When such small motors are required to deliver large output powers, there is a difficulty in dissipating the heat generated inside the motor through power losses. These motors have small masses and so, can experience very rapid rises in temperature in critical areas. At excessive temperatures, various components are subject to damage.

To keep these motors below critical temperatures, ventilation fans are mounted to the rotor, either on the shaft, on the commutator or directly to the rotor core. Generally, the fans are of a centrifugal type with straight, radial fan blades to cool the motor when the motor is operating in either clockwise or anti-clockwise rotation.

A particular fan for a PMDC motor is shown in GB 2385715. This fan design was developed to address a concern that the air flow generated by the average fan drew too much air from over the commutator and insufficient air through the rotor core and over the rotor windings due to significant differences in the resistance of the air flow paths. However, that fan design was impractical to manufacture for use in a low cost, high production motor and so the need still remains for a fan which is conveniently mounted to the rotor after assembly of the rotor and which can draw a significant volume of air through the rotor core and over the rotor windings while still drawing air over the commutator.

SUMMARY OF THE INVENTION

The present invention strives to address this issue by providing a fan for an electric motor which has a plurality of radial fan blades in which a number of the fan blades have their roots shielded from the commutator.

Accordingly, the present invention provides an electric motor as set forth in claim 1.

Preferred and/or optional features are set forth in the dependent claims.

BRIEF DESCRIPTION OF THE DRAWINGS

A preferred embodiment of the invention will now be described, by way of example only, with reference to the accompanying drawings, in which.

DETAILED DESCRIPTION OF THE PREFERRED EMBODIMENTS

Figure 1:
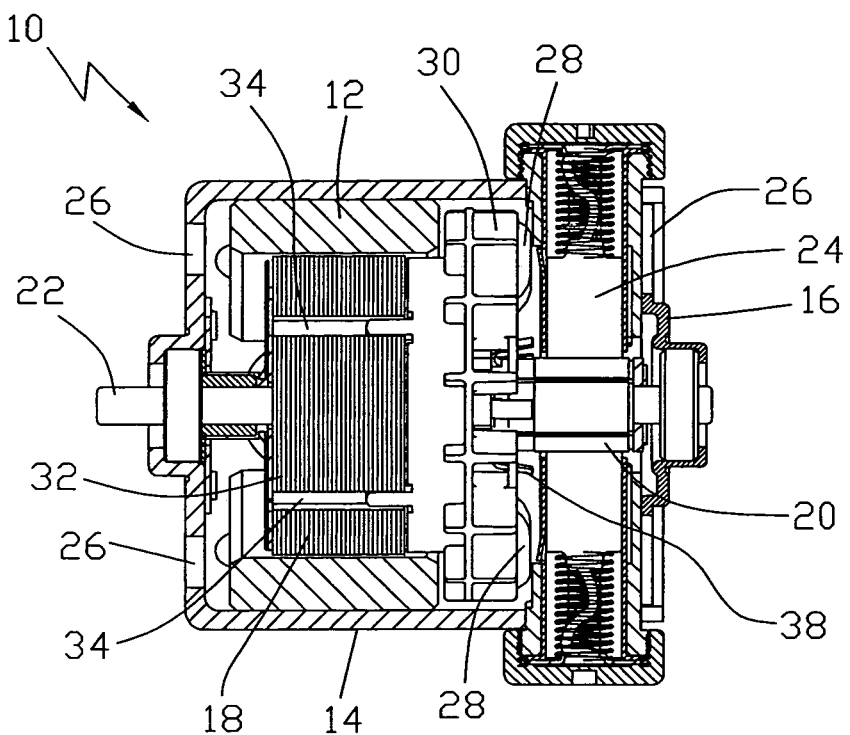
FIG. 1 is a part sectional side elevation of an electric motor fitted with an internal cooling fan according to the present invention.

The stator of the electric motor 10 shown in FIG. 1 comprises magnets 12 mounted in a housing 14 fitted with an end cap 16. The rotor comprises an armature core 18 and a commutator 20 mounted on a shaft 22 supported in bearings, respectively mounted in the closed end wall of the housing and also in the end cap. Carbon brushes 24, carried by brush cages, bear against commutator 20. Inlet vents 26 are formed in the closed end of the housing 14 and in the end cap 16. Exhaust vents 28 are formed in a side wall of the housing 12. The rotor also includes a fan 30 mounted to one end of the armature core in alignment with the exhaust vents 28.

Figure 2:
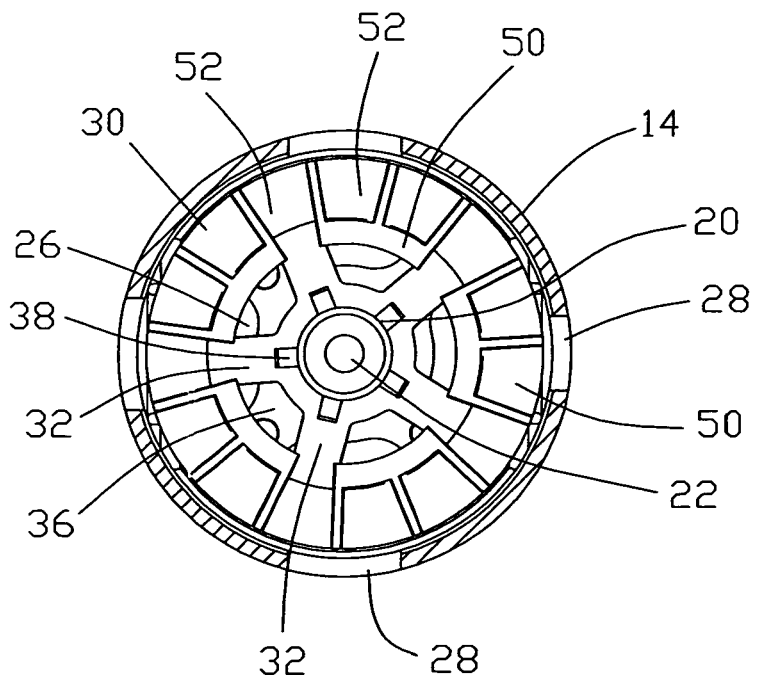
FIG. 2 is a part sectional end elevation of the motor of FIG. 1.

The armature core 18 has five armature poles 32 which are substantially "T"-shaped. The outer ends of the poles are circumferentially separated by narrow axially extending gaps 34 and larger radially inner spaces known as winding tunnels 36 (FIG. 2). Armature windings (not shown for clarity) are wound about stems of the poles 32 and are connected to commutator tangs 38.

Figure 3:
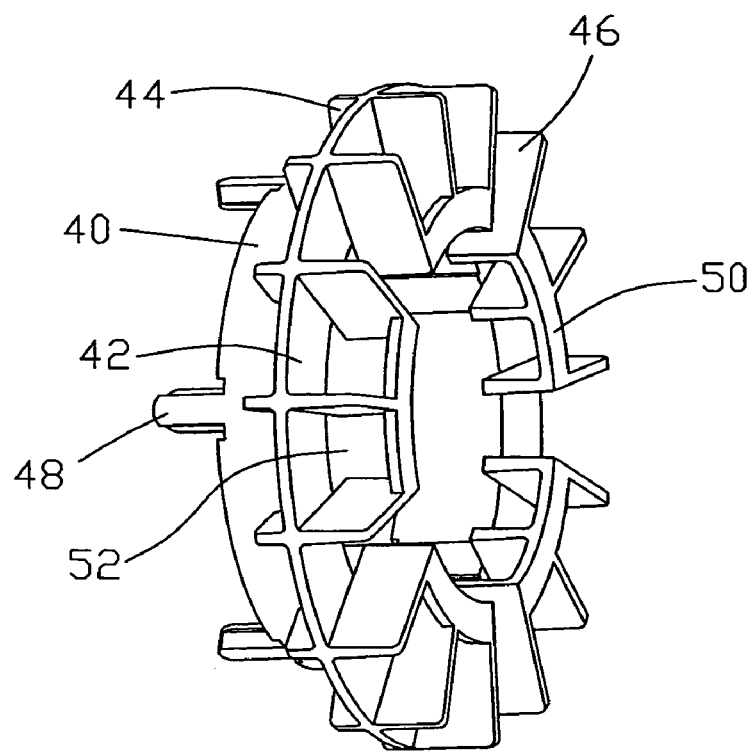
FIG. 3 is a perspective view of the fan of FIG. 1.

As shown in FIGS. 2 and 3, the fan 30 comprises a thermoplastic ring portion 40, integrally moulded with an annular plate 42 supporting first and second fan blades 44, 46, on first and second sides of the annular plate 42. The first blades 44 extend axially from and radially along the first side of the annular plate 42 facing the ring 40. The first blades 44 extend radially outwardly from adjacent the ring 40 to an outer edge of the plate 42 leaving a small gap between the radially inner ends of the first blades 44 and the ring 40. The second blades 46 extend axially from and radially along the second side of the plate 42 and extend radially outwardly from a position radially inward of the inner edge of the plate 42 to the outer edge of the plate 42. Thus the second blades 46 overhang into the axial space of the annular plate 42. The axial space may be defined as the space bounded radially by the annulus or inner diameter of the annular plate 42 projected axially along the motor shaft.

Extending axially from the ring 40 away from the plate 42 are a number of mounting posts 48. These posts fit into the gaps 34 between the armature poles 32. The posts 48 may be held by plastic deformation or an interference fit in the gaps but are preferably glued in place. The fan is fitted after the rotor has been otherwise fully assembled. When properly fitted, the posts 48 are fully inserted into the gaps 34 and the ring 40 abuts an axial end face of the armature core 18. The purpose of the ring 40 is to space the annular plate 42 axially away from the armature core to align the fan blades 48 with the commutator tangs 38 and to avoid the armature windings 36.

The second fan blades 46 are grouped in threes with the centre blades of each group aligned with the posts 48, the gaps 34 and the centre of the winding tunnels. Each centre blade is connected to the immediately adjacent blades by a radially and circumferentially extending blade wall 50 joined to the axially outer edge of the blades 46 and extending radially outwardly from the inner edge of the blades to substantially cover the overhang, i.e., that portion of the blades which extends radially inwardly passed the inner edge of the annular plate 42. The blade walls 50 form a discontinuous annular wall located in the axial space as defined above.

Fan chutes 52 are formed between adjacent fan blades and as the fan rotates, air is forced radially out along the chute and out the exhaust vents 28. The walls 50 effectively shield the inner ends of the fan blades 46 from the open area of the commutator 20 and are open facing the winding tunnels so as to draw more air from the winding tunnels into the two fan chutes 28 formed by the three fan blades 46 of each group. The fan chute 28 which exists between the groups of three is open to the area of the commutator 20 and draws air from this area to cool the commutator 20. Air flow in these chutes is predominantly from the commutator area as the other side of the air chute faces the stems of the armature poles 32 and the armature windings 36.

Figure 4:
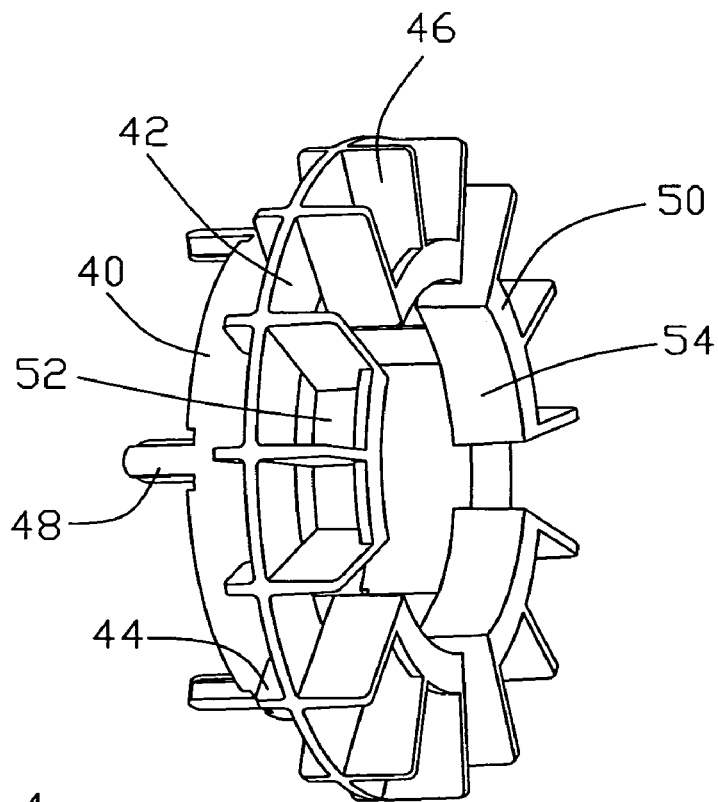
FIG. 4 is a perspective view of an alternative fan according to a second embodiment.

In an attempt to further isolate the winding tunnel air flow from the commutator air flow, the embodiment of FIG. 4 was developed. In this embodiment, an additional wall 54 is provided for each of the groups of second blades 46. Each additional wall 54 closes the radially inner ends of the fan chutes 52 of the group blades, thus forcing a higher percentage of air to be drawn from the winding tunnels than in the fan of the first embodiment.

It would be obvious to those readers skilled in the art that although two preferred embodiments have been described as examples, a further not so preferred example can be formed by making the blade walls into a continuous annular wall connecting all of the blades together and crossing the fan chutes adjacent the stems of the rotor poles. This will reduce further the air flow from the commutator by making the resistance of the air flow path higher and the suitability of this embodiment will depend on the particular application.

It may be clear that the number of second fan blades 46 is related to the number of poles of the rotor. Although the embodiments show a fan with 3 fan blades per pole and grouped in threes, we could use 2 or 4 blades per pole or more. Accordingly, the ideal number of fan blades f=n*p where p=number of rotor poles and n is an integer greater than 1.

The embodiments described above are given by way of example only and various modifications will be apparent to persons skilled in the art without departing from the scope of the invention as defined by the appended claims.

What is claimed is:

1. An electric motor comprising:
   a stator;
   a rotor having a shaft, a rotor core mounted on the shaft, a commutator fitted to the shaft adjacent a first end of the rotor core, and windings wound about salient poles of the rotor core and connected to connectors of the commutator, the salient poles having a stem extending radially from a location near the shaft and having a circumferentially extending pole face whereby adjacent pole faces are separated by a narrow gap and adjacent poles forming a tunnel for accommodating the windings open at the radially outer side by the gap,
   a housing enclosing the stator and having an end wall, adjacent a second end of the rotor core, formed with inlet vents and a side wall formed with exhaust vents adjacent the first end of the rotor core, and an open end;
   an end cap fitted to the open end of the housing and having additional inlet vents and supporting brush gear, including motor terminals for transferring electrical power to the commutator, and
   a fan fitted to the first end of the rotor core and arranged to draw air into the housing through the inlets and out of the housing through the exhaust vents, the fan having a ring portion abutting the rotor core, an annular plate formed on the distal end of the ring portion and a plurality of fan blades extending axially and radially formed on a face of the plate remote from the ring portion,
   wherein the blades extend radially inwardly passed an inner edge of the annular plate and a number of said fan blades are joined to an adjacent fan blade by blade walls, the blade walls forming at least an intermittent annular wall extending circumferentially between the said blades and extending radially from a radially inner end of the said blades to the radial height of the inner edge of the annular plate.

2. The motor of claim 1, wherein the joined fan blades are aligned with the winding tunnels of the rotor core.

3. The motor of claim 1, wherein the fan has f fan blades such that f=np where n equals an integer greater than 1 and p is the number of poles of the rotor core.

4. The motor of claim 3, wherein n equals 3.

5. The motor according to claim 4, wherein the fan blades are grouped in threes with each group centered on a respective winding tunnel and wherein the blade walls form a discontinuous annular wall joining together only the blades of each group, with an open fan chute between each group of blades facing the commutator and aligned with a respective pole stem for drawing air from over the commutator.

6. The motor of claim 1, wherein the blade walls joining the fan blades has an axially extending portion which covers the radially inner ends of at least some of the blades.

7. The motor of claim 1, wherein the fan has a plurality of fingers extending axially from the ring portion and pressed into said gaps between the pole faces to fix the fan to the rotor core.

8. The motor of claim 1, wherein the fan has a plurality of auxiliary blades formed on a face of the annular plate adjacent the ring portion and extending radially from adjacent the ring portion to a radially outer edge of the annular plate.

9. The motor of claim 1, wherein the fan blades are straight.

10. A portable, electrically operable power tool incorporating the electric motor of claim 1.

* * * * *